Patented Oct. 8, 1940

2,216,946

UNITED STATES PATENT OFFICE 2,216,946

PHONOGRAPH RECORD

James H. Hunter, Lansdowne, Pa., assignor to Radio Corporation of America, a corporation of Delaware No Drawing. Application September 30, 1937, Serial No. 166,646

3 Claims. (Cl. 106—1.5)

This invention relates to phonograph records, and more particularly to a composition of matter especially fit for use in the manufacture of such records.

As is well known in the resin record industry, commercial phonograph records are pressed from the resins, either natural or synthetic, while they are in plastic form and various fillers are incorporated therein in order to give body to the mass and control the consistency thereof, and to impart wear resistance to the finished records. Among the fillers most commonly employed are slate, various clays, metal oxides and silicates, etc., all of which are used in relatively coarse form and impart relatively high surface noise to the records when they are played. These, and many other prior art fillers, also require a relatively large amount of resin in order to provide a compound which has proper flow characteristics when heated. The more resin required for a given mass, the more expensive will the finished records be, since the resin base is by far the most expensive ingredient in the moldable composition.

The primary object of my present invention is to provide an improved composition of matter which is suitable for phonograph records and which will be free from the aforementioned and other defects present in prior art records.

More specifically, it is an object of my present invention to provide an improved molding compound from which may be made phonograph records having improved surface noise characteristics and greater life, or wear resistance, than records previously made.

Another object of my present invention is to provide, for phonograph record materials, an improved filler of such character that a relatively lesser amount of resin will be required in combination therewith to obtain proper flow characteristics than is required with previously known fillers in order to achieve equally satisfactory flow characteristics in the moldable composition.

Still another object of my present invention is to provide an improved molding compound from which may be made phonograph records having great warp resistance.

It is also an object of my present invention to provide an improved resinous composition for phonograph records which will be economical in cost and in manufacture, which readily lends itself to processing, such as working, pressing and blanking, and which produces a record having excellent characteristics from the standpoints of long life and fidelity of reproduction.

In accordance with my present invention, I incorporate into the resinous molding compound a filler of finely ground calcium carbonate. For this purpose, I have found finely pulverized natural marble to be very advantageous. If desired, precipitated calcium carbonate may also be used, but since its cost is considerably higher than the ground natural marble, the latter is preferred. When used alone, that is, without being mixed with other fillers, the compound in which it is incorporated is found to possess a remarkably low surface noise and to possess excellent warp resistance. Also, I have found that comparatively little resin is required to be used with the calcium carbonate filler in order to obtain the desired flow characteristics.

Any suitable resin may be employed as a base for the record material, such as shellac, phenolic resins, vinyl resins, resins derived from acrylic acid and its derivatives, urea resins, etc., as may other compositions which become plastic under the action of heat, either with or without pressure, such as cellulose acetate and cellulose nitrate. Calcium carbonate, as a filler, is particularly useful in connection with moldable compounds having a shellac base. A typical formula employing my present invention is as follows:

| | Pounds |
|---|---|
| Shellac | 110 |
| Rosin | 15 |
| Manila gum | 10 |
| Calcium carbonate | 135 |
| Sienna filler | 200 |
| Bone black | 15 |
| Carbon black | 15 |

Suitable plasticizers, mold lubricants, etc., may also be included.

Materials having the above and other similar formulas may be readily compounded on rolls, as used in the production of rubber compounds, for example, or they may be made in a Banbury mixer. The formula given above is merely illustrative and not limiting either as to the particular ingredients employed, or to the proportions thereof. In addition to the non-abrasive calcium carbonate filler, suitable abrasive fillers, such as silica, clay, chrome oxide, titanium dioxide, etc., may also be included, the latter helping greatly to increase resistance of the records to wear due to the action of the reproducing needle thereon, and thereby greatly increasing the life of such records.

From the foregoing description, it will be apparent to those skilled in the art that I have provided an improved composition for phonograph records which has the advantages noted above.

These advantages can also be realized by many modifications which will, no doubt, readily suggest themselves to those skilled in the art and which fall within the scope of the present invention. I, therefore, desire that my invention shall not be limited except insofar as is made necessary by the prior art and by the spirit of the appended claims.

I claim as my invention:

1. A phonograph record comprised of plastic material having a resin base and including as an ingredient thereof a filler of finely pulverized natural marble.

2. A phonograph record comprised of a material having a shellac base in which is incorporated a filler of finely ground natural marble.

3. A phonograph record comprised of a material having a shellac base and including a non-abrasive filler and an abrasive filler, said non-abrasive filler being constituted by finely pulverized natural marble.

JAMES H. HUNTER.